(12) United States Patent
Clevy et al.

(10) Patent No.: US 7,747,849 B2
(45) Date of Patent: Jun. 29, 2010

(54) SECURE COMMUNICATIONS EQUIPMENT FOR PROCESSING DATA PACKETS ACCORDING TO THE SEND MECHANISM

(75) Inventors: Laurent Clevy, Chartres (FR); Thierry Legras, Palaiseau (FR)

(73) Assignee: Alcatel-Lucent, Paris (FR)

( * ) Notice: Subject to any disclaimer, the term of this patent is extended or adjusted under 35 U.S.C. 154(b) by 974 days.

(21) Appl. No.: 11/508,188

(22) Filed: Aug. 23, 2006

(65) Prior Publication Data

US 2007/0083765 A1 Apr. 12, 2007

(30) Foreign Application Priority Data

Aug. 25, 2005 (EP) .................................. 05300694

(51) Int. Cl.
*G06F 17/00* (2006.01)
*G06F 15/16* (2006.01)
*H04L 29/06* (2006.01)

(52) U.S. Cl. ........................... 713/153; 726/12; 726/13; 726/14; 709/246

(58) Field of Classification Search ................. 713/177, 713/153; 709/238, 246; 726/12–14
See application file for complete search history.

(56) References Cited

U.S. PATENT DOCUMENTS

| | | | | |
|---|---|---|---|---|
| 7,305,704 | B2 * | 12/2007 | Ofek et al. ..................... 726/15 |
| 2003/0005330 | A1 * | 1/2003 | Berkema et al. ............. 713/201 |
| 2003/0177391 | A1 * | 9/2003 | Ofek et al. ................... 713/201 |
| 2004/0165602 | A1 * | 8/2004 | Park et al. .................... 370/401 |
| 2004/0193875 | A1 * | 9/2004 | Aura ............................ 713/162 |
| 2004/0240669 | A1 * | 12/2004 | Kempf et al. ................ 380/277 |
| 2005/0007995 | A1 * | 1/2005 | Inoue et al. .................. 370/349 |
| 2005/0011365 | A1 | 1/2005 | Lamy |
| 2005/0015507 | A1 * | 1/2005 | Chin ............................ 709/230 |
| 2005/0165953 | A1 * | 7/2005 | Oba et al. ..................... 709/238 |
| 2006/0020807 | A1 * | 1/2006 | Aura et al. ................... 713/176 |
| 2006/0077908 | A1 * | 4/2006 | Park et al. ................... 370/254 |
| 2006/0285519 | A1 * | 12/2006 | Narayanan et al. .......... 370/331 |

(Continued)

OTHER PUBLICATIONS

Author: Jerry Honeycutt Title: Introducing Microsoft® Windows® Server 2003 Date: Jan. 29, 2003 Publisher: Microsoft Press.*

(Continued)

*Primary Examiner*—Minh Dieu Nguyen
(74) *Attorney, Agent, or Firm*—Harness, Dickey & Pierce

(57) ABSTRACT

A security-procuring method for making an item of communications equipment (E) secure, said item of communications equipment comprising an operating system core (K) and a set of software applications (A), said core including at least one IPv6 protocol stack (PS) making it possible to transmit incoming data packets from an input port ($P_{IN}$) to an application (A) and to transmit outgoing data packets from an application (A) to an output port ($P_{OUT}$), said protocol stacks including a set of interfaces ($H_{PRE}$, $H_{IN}$, $H_{OUT}$, $H_{POST}$) organized to enable external modules connected to them to access said data packets transmitted by said at least one protocol stack at determined points associated with said interfaces. Said method is characterized in that an input module ($M_{IN}$) and an output module ($M_{OUT}$) are connected respectively to an input interface ($H_{IN}$) and to an output interface ($H_{OUT}$) of said core (K), and in that said modules select, analyze, and, if necessary, modify the data packets of the Network Discovery Protocol (NDP), in compliance with the Secure Neighbor Discovery (SEND) mechanism.

6 Claims, 2 Drawing Sheets

U.S. PATENT DOCUMENTS

2007/0245000 A1* 10/2007 Chen et al. .................. 709/222

OTHER PUBLICATIONS

Author: Alan Jones Title: Netfilter and IPTables—A Structural Examination Date: Feb. 26, 2004.*

J. Arkko et al, Secure Neightbor Discovery (SEND), IETF Standard, Internet Engineering Task Force IETF, CH, Mar. 2005, XP015009743.

P. Nikander et al, "IPv6 Neighbor Discovery (ND) Trust Models and Threats", IETF Standard, Internet Engineering Task Force, IETF, CH, May 2004, XP015009536.

* cited by examiner

SECURE COMMUNICATIONS EQUIPMENT FOR PROCESSING DATA PACKETS ACCORDING TO THE SEND MECHANISM

BACKGROUND OF THE INVENTION

The present invention relates to managing Internet Protocol version 6 (IPv6) data packets in an item of communications equipment.

Some of such data packets comply with the Network Discovery Protocol (NDP) as defined by Internet Engineering Task Force (IETF) Request for Comments (RFC) 2461.

That protocol defines "self-configuration" and "Network Discovery" ("ND") packets that make it possible for an item of equipment of an IPv6 communications network to determine its address and to be aware of the various items of equipment connected over each of the links. That protocol also enables each item of equipment to be informed of the changes arising on said links, e.g. when a "neighbor" item of equipment becomes inaccessible. The item of equipment can be a router (or node), a host (i.e. a terminal), a gateway, or any other device possessing means for transmitting and receiving IPv6 data packets.

In addition, by means of that protocol, the operator of the communications network no longer has to configure each of the items of equipment of its network manually, because said network self-configures by exchanging self-configuration packets that comply with the NDP.

However, it is necessary to make the data packets secure, in particular so that an unauthorized host cannot connect to the communications network. Using the NDP, it is possible for a host to usurp the identity of another host by making the access equipment that gives access to the network believe that it has the MAC interface for the network.

Such a need is crucial in radio-communications networks in which the hosts are mobile and are thus not physically and statically connected to access equipment.

It is thus important to provide the NDP with security mechanisms. RFC 3756, entitled "IPv6 Neighbor Discovery (ND) Trust Models and Threats" and dated May 2004, poses the problems and requirements for making the NDP secure. That RFC emphasizes that the prior work was based on the "IPsec" security protocol, but that that protocol requires encryption keys to be determined manually. Since that manual step is incompatible with the automatic nature of the NDP, some other approach is necessary.

That approach is proposed by IETF RFC 3971 entitled "Secure Neighbor Discovery (SEND)" and dated March 2005. From a technical point of view, the SEND mechanism consists in adding fields containing security information to each of the messages of the NDP, and more precisely to the ends of those messages. Those fields are defined partially by the RFC as the following fields: "RSA Signature option", "CGA option", "Timestamp option", and "Nonce option". However, the specifications of RFC 3971 leave open the possibility of subsequently adding new "option" fields in order to enrich the NDP and the SEND mechanism further.

Currently, the first implementations of the SEND mechanism are only just starting to be defined. Some of those implementations are based on an operating system of the Unix type. That system can be a Linux or a BSD operating system, for example. Conventionally, the core of an operating system dedicated to communications equipment includes one or more protocol stacks that manage data packet transmission in a manner that is transparent for the applications. Such IPv6 protocol stacks thus implement the software mechanisms necessary for managing the NDP and the SEND mechanism.

However, such an approach suffers from major drawbacks. The SEND mechanism might be upgraded, in particular by new "option" fields being added. Each upgrade thus requires the core of the operating system to be modified. Unfortunately, modifying an operating core (or a core of an operating system) is a complex and therefore costly operation.

SUMMARY OF THE INVENTION

An object of the invention is thus to mitigate those drawbacks by proposing an item of communications equipment that implements the SEND mechanism in a manner that is transparent for the operating system. The solution of the invention acts between the network and the operating system, and is therefore upgradable and, above all, less costly.

The invention thus firstly provides a security-procuring method for making an item of communications equipment secure, said item of communications equipment comprising an operating system core and a set of software applications, said core including at least one Internet Protocol version 6 (IPv6) protocol stack making it possible to transmit incoming data packets from an input port to an application and to transmit outgoing data packets from an application (which may be a different application or the same application) to an output port, said protocol stacks including a set of interfaces organized to enable external modules connected to them to access said data packets transmitted by the protocol stack(s) at determined points associated with said interfaces. The method is characterized in that an input module and an output module are connected respectively to an input interface and to an output interface of said core, and in that said modules select, analyze, and, if necessary, modify the data packets of the Network Discovery Protocol (NDP), in compliance with the Secure Neighbor Discovery (SEND) mechanism, in a manner that is transparent for said core.

The invention further provides an item of communications equipment comprising an operating system core and a set of software applications, said core including at least one IPv6 protocol stack making it possible to transmit incoming data packets from an input port to an application and to transmit outgoing data packets from an application (which may be a different application or the same application) to an output port, said protocol stacks including a set of interfaces organized to enable external modules connected to them to access said data packets transmitted by the protocol stack(s) at determined points associated with said interfaces. The item of communications equipment is characterized in that an input module and an output module are connected respectively to an input interface and to an output interface, and are suitable for selecting, analyzing, and, if necessary, modifying the data packets of the NDP, in compliance with the SEND mechanism, in a manner that is transparent for said core.

In an embodiment of the invention, the operating system is a Linux system, and said determined points are defined in compliance with the "NetFilter" infrastructure.

In addition, in an embodiment, the external modules analyze and modify the "CGA" and "RSA signature" options of said data packets of the NDP; it being possible for the modification to comprise adding said options.

In this way, the upgrades of the SEND mechanisms can be made by changing the input and/or output modules. The operating core remains unchanged. The development and testing cost is thus considerably reduced.

The behaviour of the core of the operating system is not affected by the actions of the input and/or output modules. For said core, said actions are transparent.

In addition, it becomes possible to make upgrades to the mechanism or merely to replace the modules with new, higher-performance or "debugged" modules directly on the item of communications equipment, without having to stop the system, make the modifications, recompile the core, and re-start the system.

The invention and its advantages appear more clearly from the following description given with reference to the accompanying figures, in which:

DETAILED DESCRIPTION OF THE INVENTION

As mentioned above, an item of communications equipment can be made up of an operating system core or "operating core" and of applications operating by means of said core. The role of the core is to enable the applications to operate independently of the hardware (manufacturer of the communications equipment, model, etc.), and of the network infrastructure (version of the network protocols, type of protocol, etc.) and to facilitate development of applications by offering a set of "functions" that are usable by the applications. Said functions are accessible to the applications by means of clearly defined interfaces.

Figure 1:
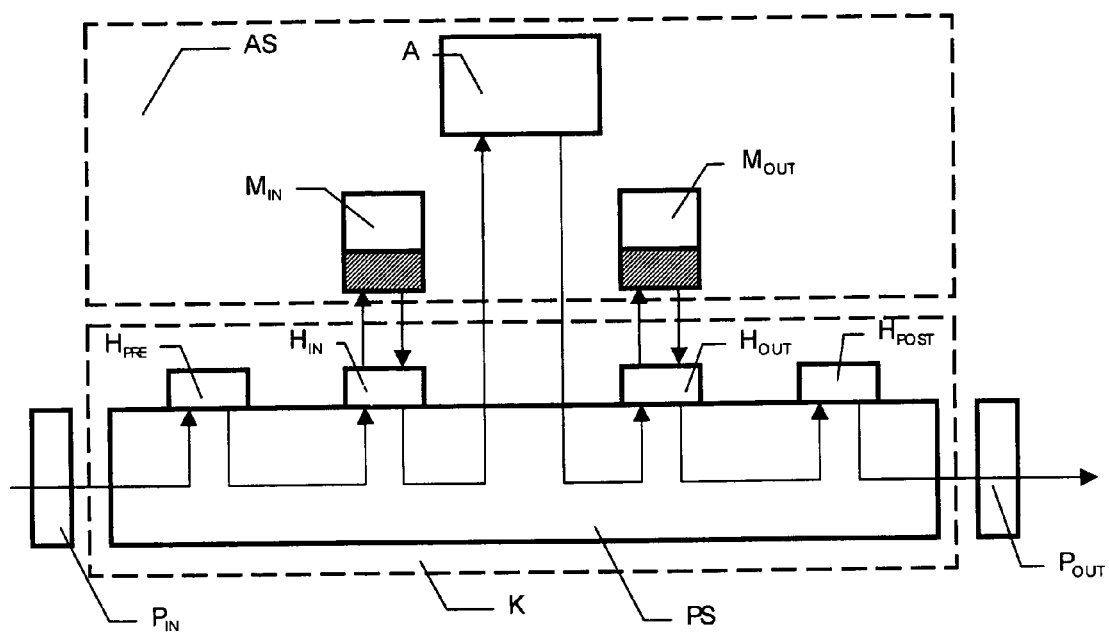
FIG. 1 diagrammatically shows an item of communications equipment of the invention.

In FIG. 1, the item of communications equipment shown thus includes a core K and a space dedicated to the applications AS ("user space" or user land").

The operating core K includes one or more protocol stacks PSs, and other functions (not shown). In the context of the invention, said protocol stack preferably complies with the IPv6 (Internet Protocol version 6) protocol. The protocol stack PS is connected firstly to an input port $P_{IN}$ and secondly to an output port $P_{OUT}$.

Each of the data packets has a header that complies with the IPv6 protocol and that specifies at least the destination address and the source address.

The incoming data packets are data packets that have, as the destination address, the IPv6 address of the item of communications equipment. Said incoming packets enter via the input port $P_{IN}$ and are transmitted by the protocol stack PS to an application A.

An application A (the same application or another application) can also transmit data packets. Said data packets then include the IPv6 address of the item of communications equipment as the source address and they are transmitted by the protocol stack to the output port $P_{OUT}$.

The protocol stack PS also includes a set of interfaces $H_{PRE}$, $H_{IN}$, $H_{OUT}$, $H_{POST}$. These interfaces are provided so as to enable external modules $M_{IN}$, $M_{OUT}$ to connect to the protocol stack in order to enable the data packets transmitted by the protocol stack to be accessed at determined points or "hooks" associated with said interfaces.

FIG. 1 shows only 4 interfaces or "hooks" $H_{PRE}$, $H_{IN}$, $H_{OUT}$, $H_{POST}$ but the protocol stack PS can posses others. Said interfaces depend on the type of operating core K.

Figure 2:
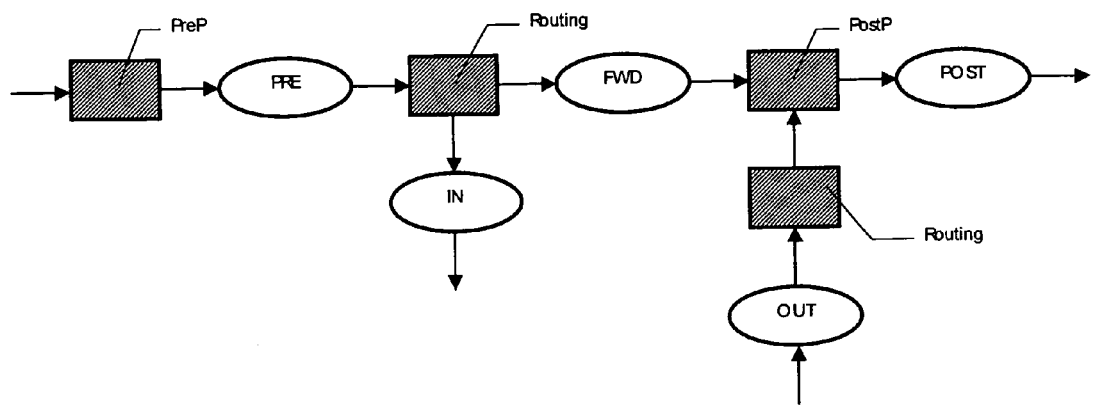
FIG. 2 shows a particular embodiment of the invention based on a Linux operating system.

In an embodiment using the Linux core, the "NetFilter" infrastructure defines five interfaces corresponding to 5 determined points in the data packet transmission. The "NetFilter" infrastructure is described by the Internet site "www.netfilter.org" and said five points are shown by FIG. 2.

The invention is not however limited to this embodiment because it can apply to other operating systems (BSD, etc.) which also offer determined points or "hooks" associated with interfaces, making it possible for external modules to access the data packets.

In the context of this embodiment based on the Linux system, each data packet arriving at an input port firstly undergoes pre-processing or "PreP". The pre-processing consists in particular in checking that the data packet is indeed complete, that the checksum contained in the packet does indeed correspond to the received data, etc. After the pre-processing, a first determined point "PRE" is found.

The data packets then go through a "routing" second processing step consisting in determining whether their destination is the item of communications equipment or whether they should be forwarded via an output port. For this purpose, the "routing" processing compares the destination address contained in each data packet with the IPv6 address of the item of communications equipment. If the addresses match, the data packet arrives at an "IN" determined point and is then transmitted to a destination application.

If the addresses do not match, it arrives at a "FWD" determined point, "FWD" indicating that it should be forwarded to another item of communications equipment.

The data packets can then undergo other processing or "post-processing" ("PostP") before they arrive at the last determined point or "POST" determined point, indicating that the packet is ready to be transmitted via an output port.

The data packets coming from the item of communications equipment arrive via an "OUT" first determined point. They undergo "Routing" processing in order to determine to where (to which port) they should be transmitted, and then any other "PostP" processing before they reach the "POST" determined point.

In other words, the determined points correspond to "states" of the processing of the data packets by the protocol stack PS, i.e. to markers along their paths.

The determined points PRE, IN, FWD, OUT and POST are associated with the interfaces, i.e. with access means for enabling applications (or modules) external to the protocol stack to access the data packets. These interfaces are referred to as "hooks" in the vocabulary specific to the NetFilter infrastructure.

The applications connected to the interfaces of the protocol stack are referred to below as "modules" so as to distinguish them from the other applications, such as those that can be termination points for the streams of data packets (such as applications A in FIG. 1).

The external modules can connect to the interfaces of the protocol stack by means of a list mechanism. Each interface corresponds to a plurality of lists, each list having a precise function. A plurality of implementations are possible, depending, in particular, on the type of core used ("mangle" and "filter" lists for Linux, "divert" list for BSD, etc.).

External modules can register with the lists of the interfaces. When a data packet reaches one of the determined points, the "NetFilter" infrastructure is called up. Said infrastructure has the means necessary for enabling the external modules that are registered in its lists to access the data packet.

However, the Applicant has observed that, in the context of the NDP, the destination address is of the "multi-cast" or "point-to-multipoint" type, they address all of the items of communications equipment subscribing to the group ("all of the nodes" or "all of the routers") on the same link. Thus, each subscriber item of communications equipment is an addressee of all of the packets of the NDP. Therefore, a first selection can be made on the basis of the type of data packet that passes or does not pass through the "NetFilter" infrastructure, by means of the "ip6tables" instruction. Here, only the data packets of the NDP are sent to the "NetFilter" infrastructure; the others continue to follow their usual paths.

In addition, in order to optimize the mechanism and in order to save resources, it is advantages to be concerned only with the "IN" and "OUT" determined points and with their associated interfaces.

Returning to FIG. 1, two external modules $M_{IN}$ and $M_{OUT}$ are thus connected to respective ones of the interfaces or "hooks" $H_{IN}$ and $H_{OUT}$. In order to use these interfaces, the external modules use the functions offered by the library "libipq". The code corresponding to these functions is represented by hatching in FIG. 1.

As mentioned above, these functions make it possible for the module to access the data packets when they are presented to an interface $H_{IN}$, $H_{OUT}$ of the protocol stack PS.

The details of the library "libipq" are explained in various documents accessible to the person skilled in the art including the "manuals pages" of operating systems ("manpages").

Without going into all of the details, the "ipq_read( )" function enables each external module to wait for the arrival of a data packet at the interface. The "ipq_get_packet( )" function then makes it possible to read the data packet, i.e. to copy it into a memory zone reserved for the external module. The external module can then read each of the items of information contained in the data packet.

Said external module can then select the NDP packets from the other data packets, and it can analyze and, if necessary, modify the selected data packets, in compliance with the SEND mechanism.

The selection and the analysis are described in more detail below, but, at this stage of the description, it is important to know that, if necessary, the memory zone into which the data packet has been copied can be modified in order to reflect that processing.

Once this has been done, the external module can use the ipq_set_verdict( )" function. This function with the argument "ACCEPT" or "MODIFIED" enables the data packet to be put back, respectively in the intact state or in the modified state, into the protocol stack PS by the interface $H_{IN}$, $H_{OUT}$ in question. This data packet is a copy of the memory zone into which it was previously copied.

In this way, the external modules can modify ("MODIFIED" argument) the data packets transmitted by the protocol stack PS in a manner transparent for said protocol stack.

The NDP packets can be selected as a function of the specifications of the NDP (Neighbor Discovery Protocol) defined by RFC 2461.

Figure 3:
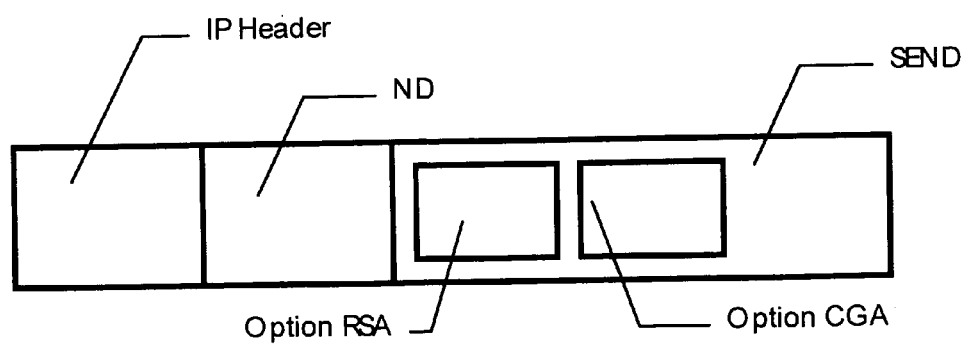
FIG. 3 shows an NDP packet implementing the SEND mechanism.

FIG. 3 diagrammatically shows the format of a data packet. It includes an "IP header" as mentioned above. Then it has a second "header" ND, made up of fields specific to the NDP. That protocol defines 5 types of data packets: "Neighbor Solicitation", "Neighbor Advertisement", "Router Solicitation", "Router Advertisement", and "Redirect".

It is possible to select the packets that comply with the NDP by analyzing said "ND" header. As described in Section 4 of RFC 2461, the ND header starts with a "type" field that defines the type of data packet as given in the following table:

| Type of packet | Value of the "Type" field |
|---|---|
| "Neighbor Solicitation" | 135 |
| "Neighbor Advertisement" | 136 |
| "Router Solicitation" | 133 |
| "Router Advertisement" | 134 |
| "Redirect" | 137 |

Packets that comply with the NDP also have a contents region that is used by the SEND mechanism for inserting options. The SEND mechanism makes provision in particular for two options: the RSA option (or more precisely the "RSA signature"), and the CGA option. Two other options (not shown in the figure) are also provided: the "TimeStamp" option and the "Nonce" option.

The CGA option makes it possible to transmit information related to the Cryptographically Generated Address (CGA) technique. That technique is described in RFC 3972 dated March 2005 and it consists in generating the IPv6 address of a network node by using an irreversible hash function on the basis of at least the public key of that node.

The "RSA" option makes it possible to attach signatures based on a public key to the NDP data packets.

These options are not independent from one another. For example, if the "CGA" and "RSA signature" options are present, then the public key determined on the basis of the "CGA" option must be the public key transmitted in the "Key Hash" field of the "RSA signature" function. If such is not the case, the packet must be deleted.

Numerous processing rules must thus be applied by the item of communications equipment, be it for transmitting the NDP packets or when it receives them.

The role of the external modules $M_{IN}$ and $M_{OUT}$ is then to apply said processing rules for the second and first cases respectively. They can perform this role in a manner that is entire transparent for the operating core. This thus consists firstly in analyzing the NDP packets (mainly for $M_{IN}$) in order to ensure that they comply with the SEND mechanism, and secondly in modifying the NDP data packets (mainly for $M_{OUT}$) in order to make them comply with the SEND mechanism.

If a new version of the processing code of the SEND mechanism is available, it then suffices to incorporate said code into said external modules without modifying the core itself. Similarly, if the SEND mechanism is upgraded and defines new options, it also suffices to incorporate the code relating to the upgrades in the external modules without modifying the operating core.

In the situation when the core of the operating system does not have infrastructure similar to the "NetFilter" infrastructure, i.e. infrastructure having interfaces associated with determined points, it remains possible to implement the invention in a "degraded" mode. It is possible to look at the packets before they enter the protocol stack and when they exit therefrom. Software modules $M_{IN}$, $M_{OUT}$ can thus be connected to the input and to the output of said protocol stack so as to modify, if necessary, the packets corresponding to the NDP in compliance with the SEND mechanism.

The invention claimed is:

1. A security-procuring method for making a gateway secure, said gateway including, an operating system core, said operating system core including at least one IPv6 protocol stack, said protocol stacks including a set of interfaces organized to enable external modules connected to the set of interfaces to access data packets transmitted by said at least one protocol stack at determined points associated with said interfaces, wherein said method comprises:
- connecting an input module to an input interface of said operating system core;
- connecting an output module to an output interface of said operating system core;
- selecting and analyzing the data packets of a Network Discovery Protocol by at least one of the input module and the output module;
- modifying the data packets of the Network Discovery Protocol by at least one of the input module and the output module in compliance with a Secure Neighbor Discovery Protocol mechanism, in a manner that is transparent for said operating system core, said external modules analyzing and modifying a "CGA" option and a "RSA signature" option of said data packets of the Network Discovery Protocol; and
- situating the determined points at an input port and an output port of said protocol stacks.

2. The security-procuring method according to claim 1, wherein said operating system is a Linux system, and said determined points are defined in compliance with a "NetFilter" infrastructure.

3. The security-procuring method according to claim 2, wherein said external modules analyze and modify a "CGA" option and a "RSA signature" option of said data packets of the Network Discovery Protocol.

4. An item of communications equipment comprising:
an operating system core;
said operating system core including at least one IPv6 protocol stack;
said protocol stacks including a set of interfaces organized to enable external modules connected to the set of interfaces to access data packets transmitted by said at least one protocol stack at determined points associated with said interfaces;
an input module and an output module connected respectively to an input interface and to an output interface; and
wherein said input module and output module are configured to select, analyze, and modify the data packets of a Network Discovery Protocol, in compliance with a Secure Neighbor Discovery Protocol mechanism, in a manner that is transparent to said operating system core, said external modules analyzing and modifying a "CGA" option and a "RSA signature" option of said data packets of the Network Discovery Protocol; and
situating the determined points at an input port and an output port of said protocol stacks.

5. The item of communications equipment according to claim 4, wherein said operating system is a Linux system, and said determined points are defined in compliance with a "NetFilter" infrastructure.

6. The item of communications equipment according claim 5, wherein said external modules analyze and modify a "CGA" option and a "RSA signature" option of said data packets of the Network Discovery Protocol.

* * * * *